United States Patent [19]
Simon et al.

[11] Patent Number: 5,434,565
[45] Date of Patent: Jul. 18, 1995

[54] AUTOMATIC WEATHER MONITORING AND ADAPTIVE TRANSMITTING SYSTEM

[75] Inventors: Gary B. Simon, Winchester, Mass.; David Wartofsky, Fort Washington, Md.

[73] Assignee: Potomac Aviation Technology Corporation, Boston, Mass.

[21] Appl. No.: 215,926

[22] Filed: Mar. 22, 1994

[51] Int. Cl.⁶ .................................................. G08G 5/00
[52] U.S. Cl. .................................. 340/949; 73/178 T; 340/968; 455/54.2
[58] Field of Search ............... 340/949, 968, 948, 945, 340/963, 905; 73/170.01, 170.02, 170.05, 170.06, 170.16, 178 T; 455/58.1, 54.1, 54.2, 223, 98; 379/41, 42, 67, 72, 76, 89, 201, 204; 364/443

[56] References Cited
U.S. PATENT DOCUMENTS

| | | | |
|---|---|---|---|
| 3,235,838 | 2/1966 | Hilt | 340/26 |
| 3,281,789 | 10/1966 | Willcox et al. | |
| 3,373,405 | 3/1968 | Gadbois | |
| 3,949,399 | 4/1976 | Huber et al. | 343/100 |
| 4,043,194 | 8/1977 | Tanner | 73/178 |
| 4,079,905 | 3/1978 | Greene | 244/191 |
| 4,093,937 | 6/1978 | Habinger | 340/949 |
| 4,163,216 | 7/1979 | Arpino | 340/949 |
| 4,295,139 | 10/1981 | Arpino | |
| 4,318,076 | 3/1982 | Whitfield | 340/949 |
| 4,635,285 | 1/1987 | Coombes | 455/54.2 |
| 4,780,715 | 10/1988 | Kasugai | 455/54.2 |
| 4,788,543 | 11/1988 | Rubin | 455/58.1 |
| 4,839,645 | 6/1989 | Lill | 340/870.17 |
| 5,025,382 | 6/1991 | Artz | 364/439 |
| 5,105,191 | 4/1992 | Keedy | 340/968 |
| 5,265,024 | 11/1993 | Crabill et al. | 364/443 |
| 5,282,204 | 1/1994 | Shpancer et al. | 455/54.1 |
| 5,305,374 | 4/1994 | Snyder | 379/76 |

OTHER PUBLICATIONS

F. A. A. Advisory Circular, "Automated Weather Observing Systems (AWOS) for Non–Federal Applications", AC No. 150/5220-16A, Jun. 12, 1990, pp. 1–51.

*Primary Examiner*—Brent Swarthout
*Attorney, Agent, or Firm*—Hamilton, Brook Smith & Reynolds

[57] ABSTRACT

A method for automatically providing weather advisories for an airport to pilots comprises monitoring weather conditions at the airport and then generating weather advisories in response to these weather conditions. The broadcast traffic on a common traffic advisory channel is also simultaneously monitored and then menus providing for selectable weather advisories and radio check options are broadcast to the pilots. The weather advisories or radio check can then be selected by the pilot by clicks of their transmit button. The time spacing between the menus is adaptively changed in response to traffic on the common traffic advisory frequency. Also, the length of the weather advisories is also changed in response to this traffic. The radio check option is provided automatically by first confirming selection of the radio check option and then allowing the broadcaster to broadcast a short message which is recorded by the system and then rebroadcast.

39 Claims, 6 Drawing Sheets

AUTOMATIC WEATHER MONITORING AND ADAPTIVE TRANSMITTING SYSTEM

BACKGROUND OF THE INVENTION

At large airports, takeoff and landing slots, runway assignments, holding patterns, and approaches are handled by the tower's air traffic controllers during operating hours of the control tower. Smaller airports, however, rarely have the traffic to justify the expenses associated with the equipment and salaries of the tower crew. Instead, most small airports have their own Common Traffic Advisory Frequency (CTAF) which is unique for their geographic region. A CTAF is also usually assigned for after hours use at controlled airports. The CTAF of each airport is published and readily available.

Essentially, the CTAF serves as a radio bulletin board. A pilot approaching or departing an airport tunes to the CTAF channel for that airport and monitors for activity. The pilot will then broadcast his/her intentions and position so that other pilots also monitoring the CTAF channel can plan their own operations accordingly. Consequently, broadcasts on the CTAF are rarely to a specific listener. Instead, they are simply general declarations of an intended course of action to anyone currently using the airport. In this way, smaller airports have a system by which pilots can coordinate their activities without requiring a dedicated control tower.

In addition to the bulletin board function, a pilot can also ask for a radio check on the CTAF from other listeners and get information regarding the airport's services and other business functions. The limitations on CTAF usage are set forth by Federal Communications Commission Regulations.

On a related topic, many mid- and larger size airports have an Automatic Weather Observation System (AWOS) which, as its name suggests, automatically provides weather information over a dedicated frequency. Most commonly, the AWOS units are small weather stations that monitor wind speed, wind direction, dew point, and barometric pressure and then transmit this gathered information using a synthesized voice continually and repeatedly every one to three minutes. The frequency allocations for the AWOS are also published so that an incoming pilot, for example, can select an appropriate runway from the wind direction and speed transmitted by the AWOS system without requiring intervention from the ground.

SUMMARY OF THE INVENTION

The present invention is generally directed to providing AWOS-type information automatically over the CTAF in addition to other services such as radio checks. This is accomplished by providing a system that monitors the traffic over the CTAF and then broadcasts menus containing radio check options and/or weather advisory options periodically. As such, the present invention is directed to a method for automatically providing weather advisories for an airport to pilots that comprises automatically and periodically monitoring weather conditions at the airport, and then broadcasting the weather advisories in response to the monitored weather conditions on a common traffic advisory frequency for the airport. In a specific embodiment of the invention, the lengths of the broadcasts of the weather advisories are also adaptively changed in response to the traffic.

A different aspect of the invention is directed to a method for automatically providing radio checks to vehicle radios. This method comprises broadcasting a selectable radio check option and then in response to selection of the radio check option by a remote broadcast source, generating a recording of the broadcast of the remote broadcast source. Thereafter, the broadcast of the remote broadcast source is rebroadcasted by playing back the recording. In a particular embodiment, the selection of the radio check option comprises the remote broadcast source broadcasting in accordance with a predetermined protocol. Also, the selection of the radio check option can further comprise confirming selection of the radio check option to the remote broadcast source.

The present invention can also be characterized in the context of a device for broadcasting weather advisories to pilots. Such a device comprises an automatic weather station for generating weather data indicative of ambient weather conditions and a transceiver for generating a carrier detect signal in response to detection of broadcasts from other sources and broadcasting synthesized voice menus and weather advisories. Further, a central processing unit generates the synthesized voice menu and the weather advisories in response to the carrier detect signal.

In a particular embodiment of the invention, the central processing unit classifies the broadcasts from the other sources in response to lengths of the carrier detect signal and then adaptively changes time periods between successive broadcasts of the synthesized voice menus in response to the classification. Also, the central processing unit adaptively changes the length of the weather advisories in response to the classifications.

Further, the invention can also be characterized in the context of a device for automatically providing radio checks to vehicle radios. This device comprises a transceiver for generating a carrier detect signal in response to detection of broadcasts from other sources, receiving the broadcasts from the other sources, and broadcasting recorded messages. The device also includes a central processing unit for generating a menu indicating a radio check option selectable by a predetermined protocol, monitoring the carrier detect signal to determine receipt of the predetermined protocol, recording the broadcasts in response to receipt of the predetermined protocol, and for replaying the recorded broadcasts as the recorded messages broadcasted by the transceiver.

The above and other features of the invention including various novel details of construction and combinations of parts will now be more particularly described in reference to the accompanying drawings and pointed out in the claims. It will be understood that the particular automatic weather monitoring and adaptive transmitting system embodying the invention is shown by way of illustration and not as a limitation of the invention. The principles and features of this invention may be employed and varied in numerous embodiments without departing from the scope of the invention.

DETAILED DESCRIPTION OF THE PREFERRED EMBODIMENT

A major drawback of the AWOS is the fact that it requires a dedicated frequency. This requirement is established both by Federal Communication Commission Regulation and by pragmatism. Since the AWOS continually and repeatedly transmits weather information, there is no time in between broadcasts for other people to transmit. Further, there is no system that disables the AWOS transmission when other parties are broadcasting. In addition, obtaining a frequency designation for an AWOS usually takes upwards of three years since few frequencies are still available in the part of the radio spectrum allocated for aviation communication. For these reasons, AWOS systems are often difficult to implement.

Additionally, the fact that AWOS and CTAF are assigned to independent frequencies complicates the pilot's role. For instance, pilot on approach to an airport will have to monitor both the AWOS frequency and the CTAF. Consequently, not only must the airplane contain two radios, but these radios must be correctly tuned and simultaneously monitored by the pilot.

The present invention seeks to solve these recognized problems by expanding the role of the Common Traffic Advisory Frequency (CTAF), or for that matter, any other general communication channel, by providing general information announcements, weather information for example, over the frequency. These announcements are controlled in such a way as to not undermine the frequency's inter-party communication function by avoiding broadcast collisions and adaptively modifying the length and timing of the announcements.

Figure 1:
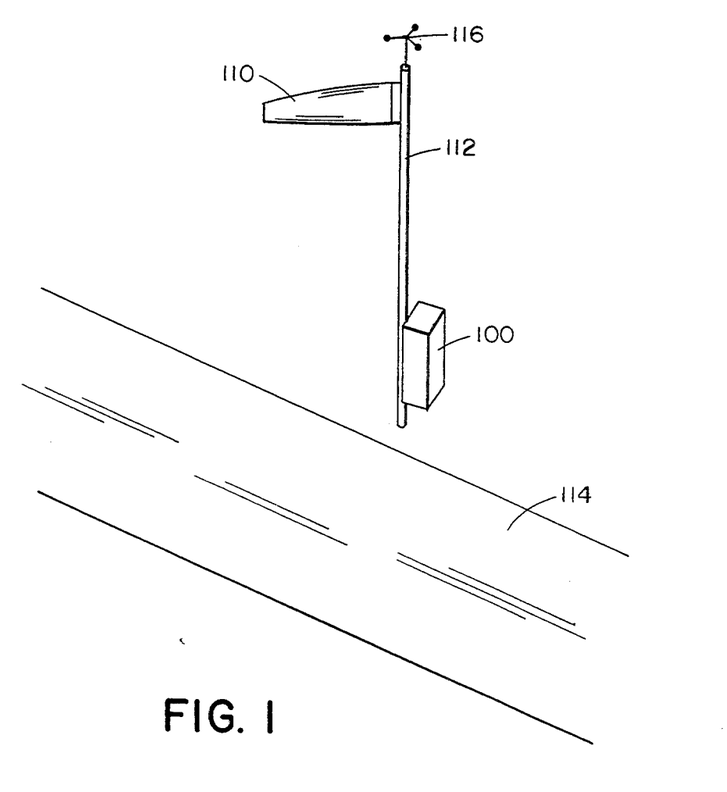
FIG. 1 is a perspective view of the automatic weather monitoring and adaptive transmitting system installed at an airfield.

Turning now to the figures, the location of monitoring and adaptive transmitting system constructed according to the principles of the present invention is shown at a typical airfield in FIG. 1. A windsock 110 hung from a windsock pole 112 is usually located near a principle runway 114 of the airfield. The windsock 110 provides pilots, both on the ground and circling the airport, with wind direction and speed information. The monitoring and adaptive transmitting system 100 is ideally located on the windsock pole 112 so that the weather information it collects will be taken as close to the point of interest, the runway 114, as possible. Also, this central location provides an ideal place for the transmitter since it provides a large and flat ground plane.

Figure 2:
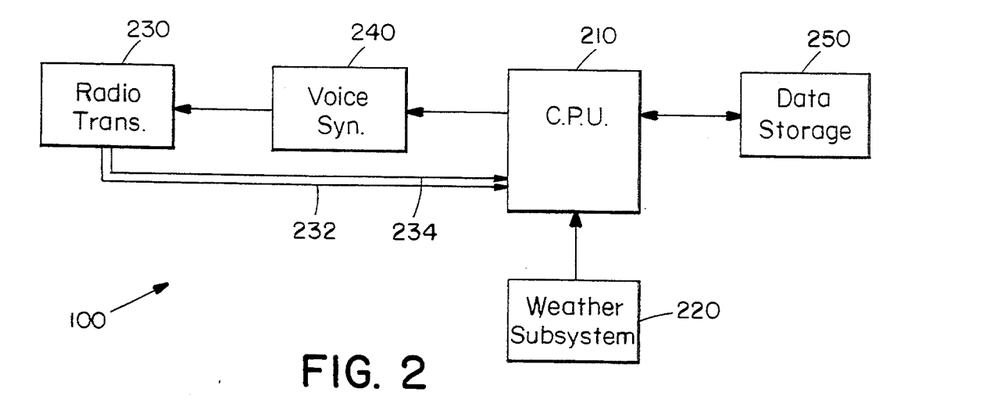
FIG. 2 is a block diagram of the automatic weather monitoring and adaptive transmitting system.

FIG. 2 is a block diagram showing the main components of the monitoring and adaptive transmitting system 100. A central processing unit (CPU) 210 of the system receives weather information from a weather monitoring subsystem 220. The weather monitoring subsystem 220 monitors wind speed and direction through the wind sensor 116 in FIG. 1 on the top of the windsock pole in addition to barometric pressure and dew point. This information is then provided digitally to the central processing unit 210. A radio transceiver 230 continually monitors for broadcasts on the CTAF, and in response to a broadcast from a different source, the radio transceiver 230 generates a carrier detect signal over line 232, which is received by the central processing unit. Also, the transceiver provides received broadcasts to the central processing unit over line 234.

The central processing unit 210 determines the length of each carrier detect signal and categorizes each occurrence of the signal as either a transient, a click or a conversation. If the length of the carrier detect signal is less than 55 milliseconds then the central processing unit 210 assumes that a transient such as an atmospheric discharge has occurred. If the carrier detect signal is between 55 milliseconds and 715 milliseconds, the CPU classifies this event as a click, a depression and release of a transmit button by another broadcast source. A consecutive series of clicks represent a coded request for information. For example, three clicks may represent a request for a weather advisory. Finally, if the length of the carrier detect signal exceeds 715 milliseconds, the signal is classified as a conversation. A series of clicks and conversations are logged as "events" in a data storage system 250. The logged data includes the date, time, classification, and duration of the particular event. On the basis of the database of the logged events and the state of the carrier detect signal, the central processing unit controls a voice synthesizer 240 to generate synthesized voice advisories as described below, which are then broadcasted by the transceiver 230.

Figure 3:
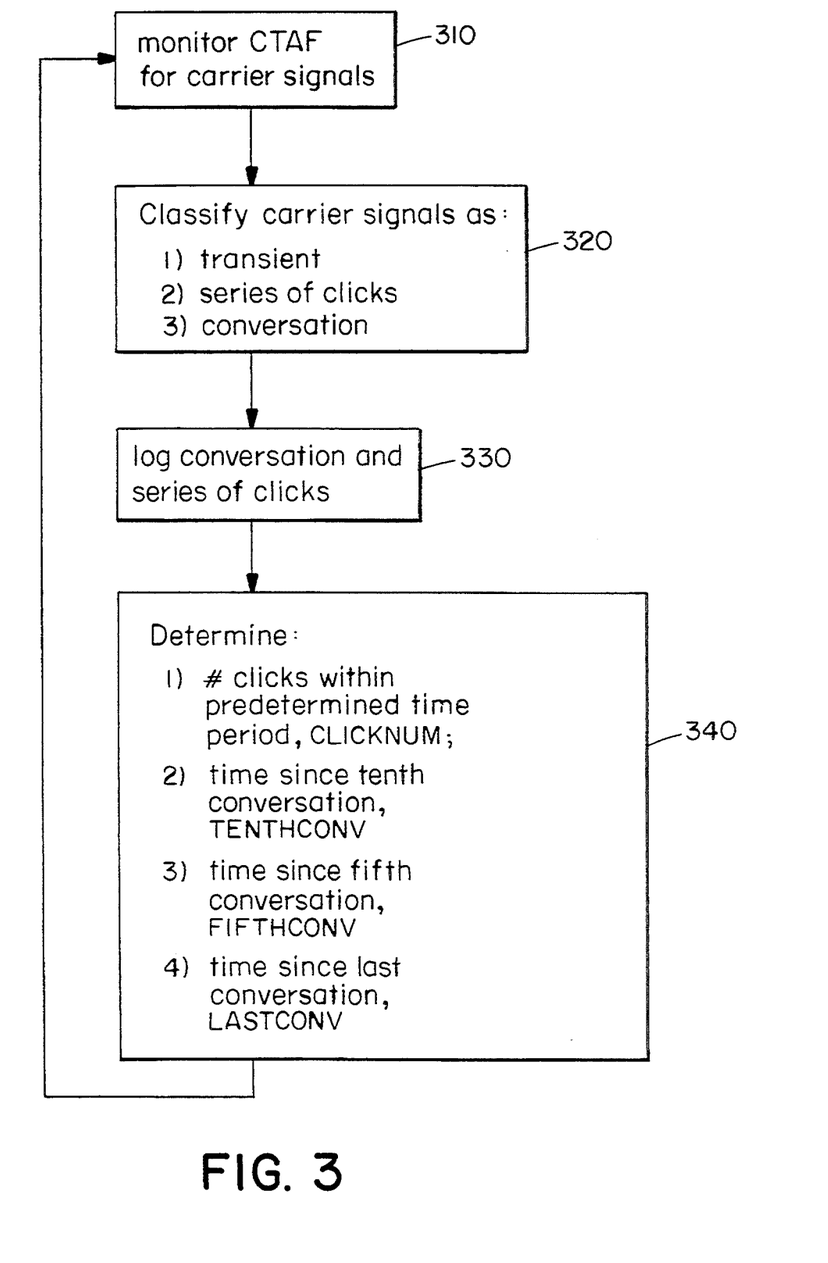
FIG. 3 is a flow diagram of a background routine executed by the central processing unit of the system.

Generally, a background routine, illustrated in FIG. 3, enables the central processing unit to continually monitor the CTAF and log detected events. Specifically, in step 310 the CTAF is monitored and carrier detect signals are generated in response to carrier signals from other sources. Then, in step 320 the detected carrier signals are classified as either a transient, a click, or a conversation. As a result of this classification, events classified as a series of clicks and conversations are logged in the data storage system in step 330.

On the basis of the logged series of clicks and conversations, a number of variables are then continually updated in step 340. CLICKNUM corresponds to the total number of clicks received within a predetermined time period. The predetermined time period corresponds to the period in which the central processing unit will look for a series of clicks to select a particular function. A variable TENTHCONV corresponds to the time that has lapsed since the tenth most recent conversation and thus gives an indication of the levels of traffic or frequency of broadcasts on the frequency. When TENTHCONV is small, traffic on the frequency will be large since a large number of conversations have happened within a short time period. A second variable FIFTHCONV represents the time since the fifth most recent conversation. And finally, LASTCONV corresponds to the time since the last conversation. Each of these variables is then passed to a foreground routine while the background routine loops back to step 310.

The foreground routine shown in FIGS. 4A through 4D controls the general operation of the system and allows the system to interreact with users attempting to access it. The foreground routine begins with an initialization of a pop-up interval to ten minutes and an advisory abbreviation to a full advisory or Level IV in step 404. Advisory abbreviation levels will be described below in detail. The pop-up interval corresponds to the time period between pop-up broadcasts and the advisory abbreviation corresponds to the amount of information contained in an airport and weather advisory. Basically, this variable controls the shortening of the advisory in response to traffic volume on the CTAF.

Figure 4A:
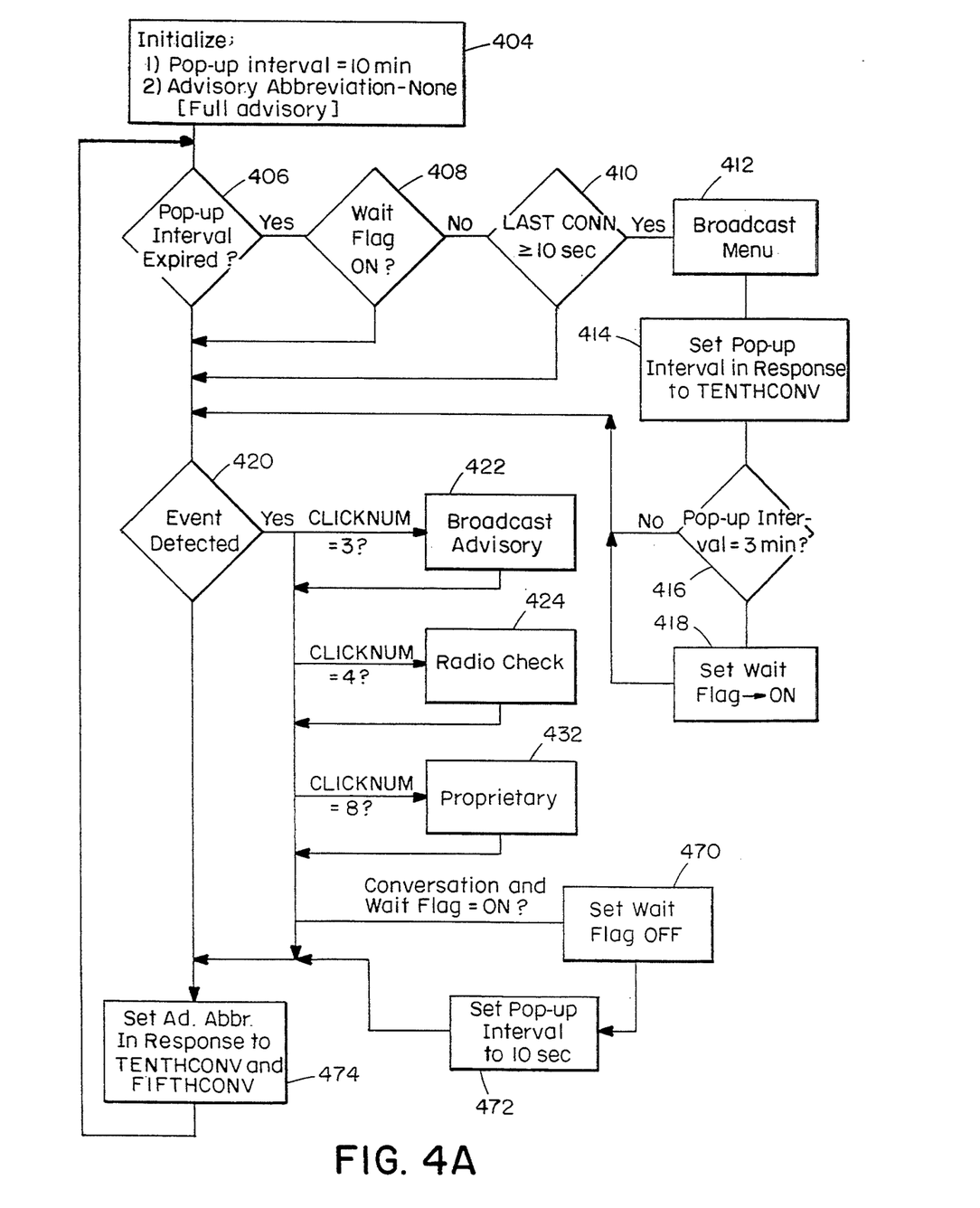
FIGS. 4A, B, C, and D are flow diagrams of a foreground routine executed by the central processing unit.
Figure 4B:
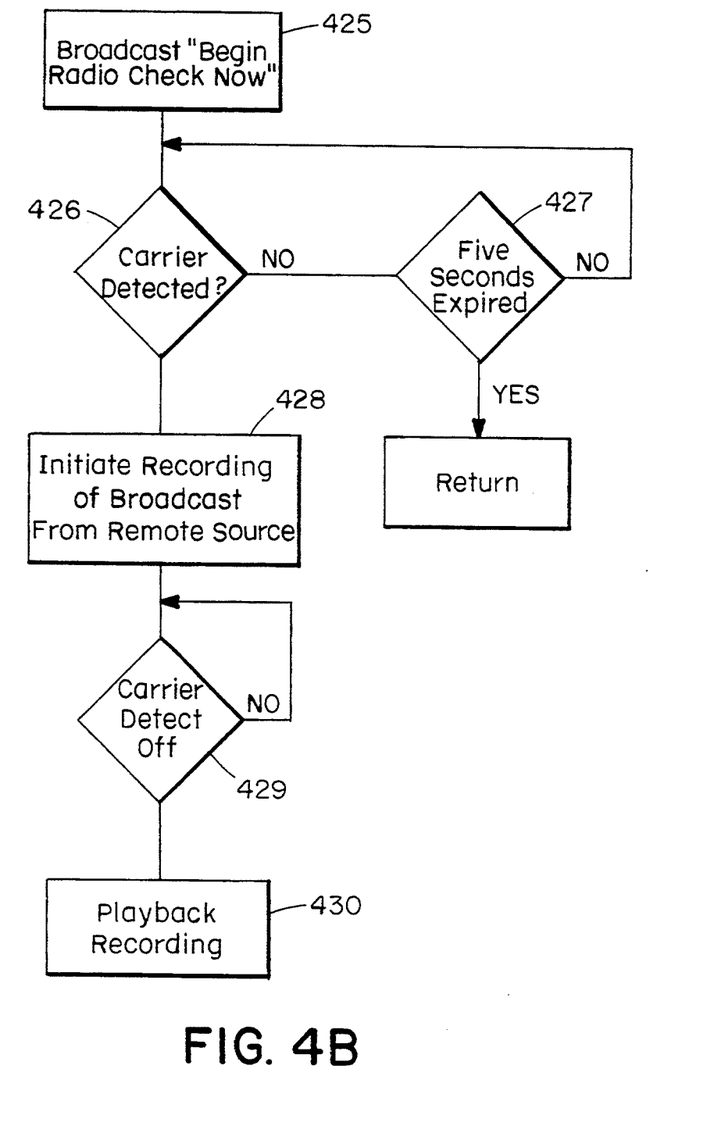

After the initialization, the foreground routine continuously loops through three general operations: 1) generate a pop-up broadcast if conditions are met; 2) execute appropriate subroutine if a series of clicks are detected; and 3) adjust advisory abbreviation and the pop-up interval in response to the level of activity on CTAF.

A pop-up is a timed or periodic broadcast of information over CTAF initiated by the system. This is opposed to information broadcasted in response to a pilot request by actuating the system. A pop-up broadcast usually includes an identification of the airport along with AWOS-type information or a menu of instructions of how to operate the system and obtain AWOS-type information.

For example, a menu of instructions-type broadcast would include: "Alpha Airport, enter three clicks for advisory, four clicks for radio check." In a pop-up broadcast including the AWOS-type information, the option for an advisory is replaced with relevant weather information.

The pop-up broadcast is usually generated when the time since the last pop-up broadcast exceeds the pop-up interval as determined in step 406. The generation of the pop-up broadcast will be disabled if either a Wait Flag is set to ON as determined in step 408 or a conversation is occurring or has occurred within the last ten seconds, i.e., LASTCONV is less than ten seconds, as determined in step 410.

In the situation in which the frequency is active or recently active as indicated by the fact that LASTCONV is less than ten seconds as determined in step 410 the system delays the pop-up broadcast. This ten second delay enables a broadcaster to finish his/her conversation and allow someone to answer without the pop-up broadcast being injected into an inter-party conversation.

When the Wait Flag is Off and a conversation has not recently occurred, the pop-up broadcast is generated in step 412. Thereafter, in step 414 the pop-up interval is adaptively modified in response to the variable TENTHCONV. Specifically, the pop-up interval is changed between ten minutes and three minutes in accordance with Table I.

TABLE I

| $T_{10}$ (Seconds) | Pop-Up Interval (Minutes) |
|---|---|
| $0 < T_{10} \leq 170$ | 10 |
| $120 < T_{10} \leq 440$ | 5 |
| $600 < T_{10}$ | 3 |

Then in step 416 the Wait Flag is set ON if the pop-up interval is three minutes. This check is provided so that if the frequency is very inactive such as in the early morning hours, the system will not continuously broadcast the pop-up when there are no listeners. In this case, the system enters a wait mode in which it terminates all broadcasts of the pop-up until a conversation is again detected by setting the Wait Flag to ON in step 418.

After the check for the expiration of the pop-up interval in step 406 and the possible pop-up broadcast, the foreground routine proceeds in step 420 to determine whether an event corresponding to a series of clicks or a conversation has occurred. If CLICKNUM is equal to three, that is if a remote broadcaster has selected the advisory by three clicks of his/her transmit button, then the system transmits an airport and weather advisory in compliance with the advisory abbreviation in step 422. If the advisory abbreviation variable is indicative of no abbreviation, then the broadcasted advisory is a complete advisory of all available weather conditions, including barometric pressure, dew point, wind speed, wind direction, density altitude, and any other general notices such as a preferred, or suggested, runway assignment. Abbreviation levels based on traffic on the frequency define certain conditions in which information is omitted from the broadcast. A total of five levels of abbreviation are provided as shown in Table II.

TABLE II

| Level | $T_{10} + T_5$ (second) | Audio Advisory |
|---|---|---|
| I | $0 < T_{10} + T_5 \leq 20$ | Wind Data, preferred runway/tail wind caution |
| II | $20 < T_{10} + T_5 \leq 30$ | I + Altimeter |
| III | $30 < T_{10} + T_5 \leq 35$ | II + Temp./Dew/Fog |
| IV | $35 < T_{10} + T_5 \leq 70$ | III + Density Altitude |
| V | $70 < T_{10} + T_5$ | IV + NOTAMs/Manual Weather |

A preferred runway designation is generated in response to both wind direction and the traffic on the frequency. More specifically, the preferred runway is made on the basis of moving average of the wind direction. The system will be slow to change a suggested runway, however, when traffic is high on the frequency suggesting that a large number of planes are currently in a pattern to land on the current preferred runway. When a change in wind direction indicates a change in the preferred runway, i.e. 95° or greater off, the system broadcasts within the advisory a caution of possible tail winds, but without changing the preferred runway. The system then waits for a three to five minute break in the frequency's traffic before broadcasting a special pop-up in which the preferred runway is actually changed.

If CLICKNUM=4 the radio check subroutine is performed in step 424. The subroutine is completely shown in FIG. 4B. Here, a confirmation of the selection of the radio check feature, for example, "transmit radio check now" is performed in step 425. The system then waits for five seconds for detection of carrier signal in step 426. If a carrier signal is not detected within five seconds as determined in step 427, the process returns to the foreground routine. Once a carrier is detected, the system immediately records any broadcast on the CTAF for five seconds in step 428. The recording is then played back in step 430 only after the carrier signal is no longer detected in step 429 so that the broadcaster can confirm that the radio is properly operating by listening to his/her rebroadcasted message.

This method for providing a radio check has certain advantages over traditional methods. When a pilot requests a radio check over the CTAF, he/she rarely knows the position of the person responding to the request. Therefore, although the party performing the radio check may receive a very coherent signal, they do not know across what distance the signal has traveled and thus the strength of the transmission. Secondly, the response of the accepting party is a very subjective determination of the coherence of the broadcast. With the present invention, there is no way of over estimating the quality of the transmission and hence the condition of the pilot's radio. Thirdly, if there is no response, then a radio malfunction may be present. In the present invention, the broadcast the pilot hears is his/her own, allowing the pilot to readily evaluate the signal strength and coherence. Further, since the pilot will know his/her position in relation to the airport, the distance the signal has travelled is also known.

Eight clicks, CLICKNUM=8, identifies selection of a proprietary mode subroutine in step 432, which enables an operator to reconfigure the system for special circumstances. As shown in detail in FIG. 4C, the operator must first enter a two digit password by clicking his microphone transmit button. Specifically, in step 434 the selection of the proprietary mode is confirmed by the system broadcasting a double click, for example. After this confirmation, an operator then understands that the first digit of the password should be entered by clicking the transmit button of the microphone five times in the case of a password of 58. If the first digit is correctly entered as determined in step 436 the system confirms entry in subsequent step 438. Otherwise, the system returns to the foreground routine in FIG. 4A.

Figure 4C:
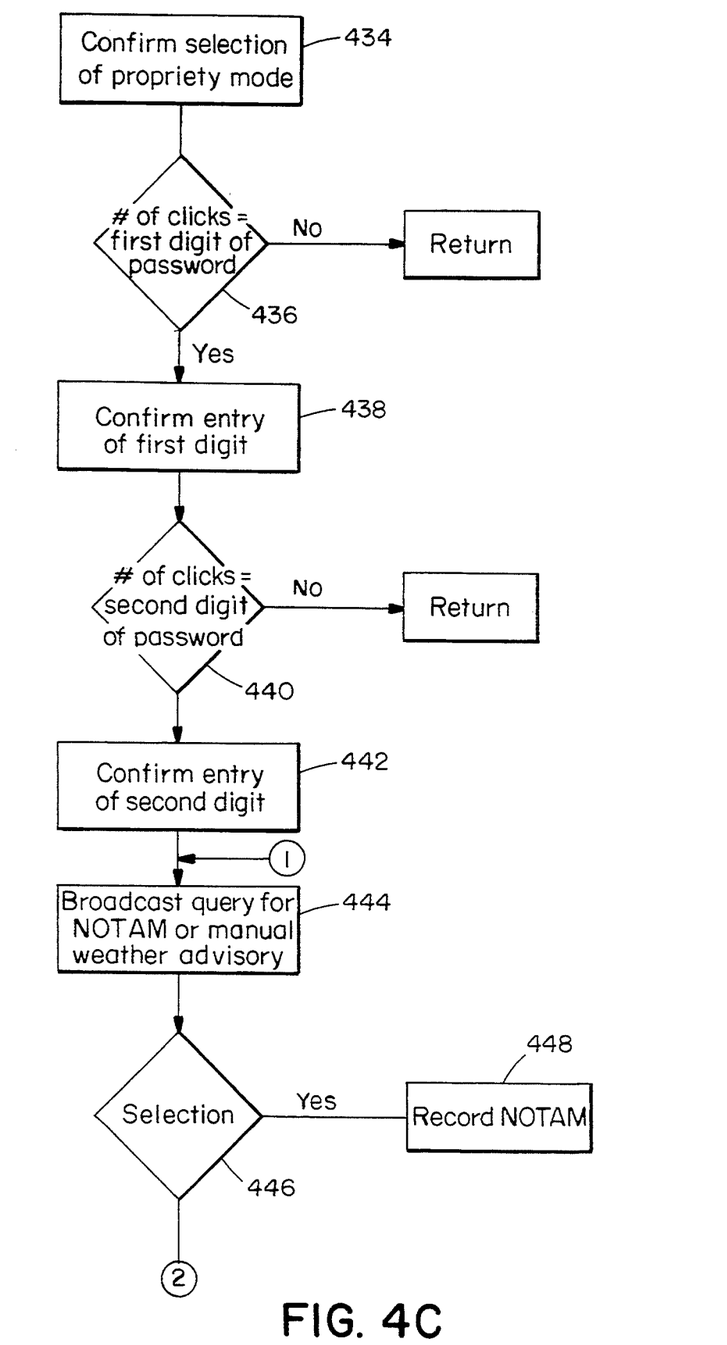

Once the user accurately enters the first digit and he receives confirmation, the second digit of the password is entered. Here again, if the second digit 8 is not entered as determined in step 440, by clicking the microphone eight times, the system automatically branches back to the foreground subroutine. Upon the successful entry of the second digit, however, confirmation of the propriety mode's selection is provided in step 442.

Figure 4D:
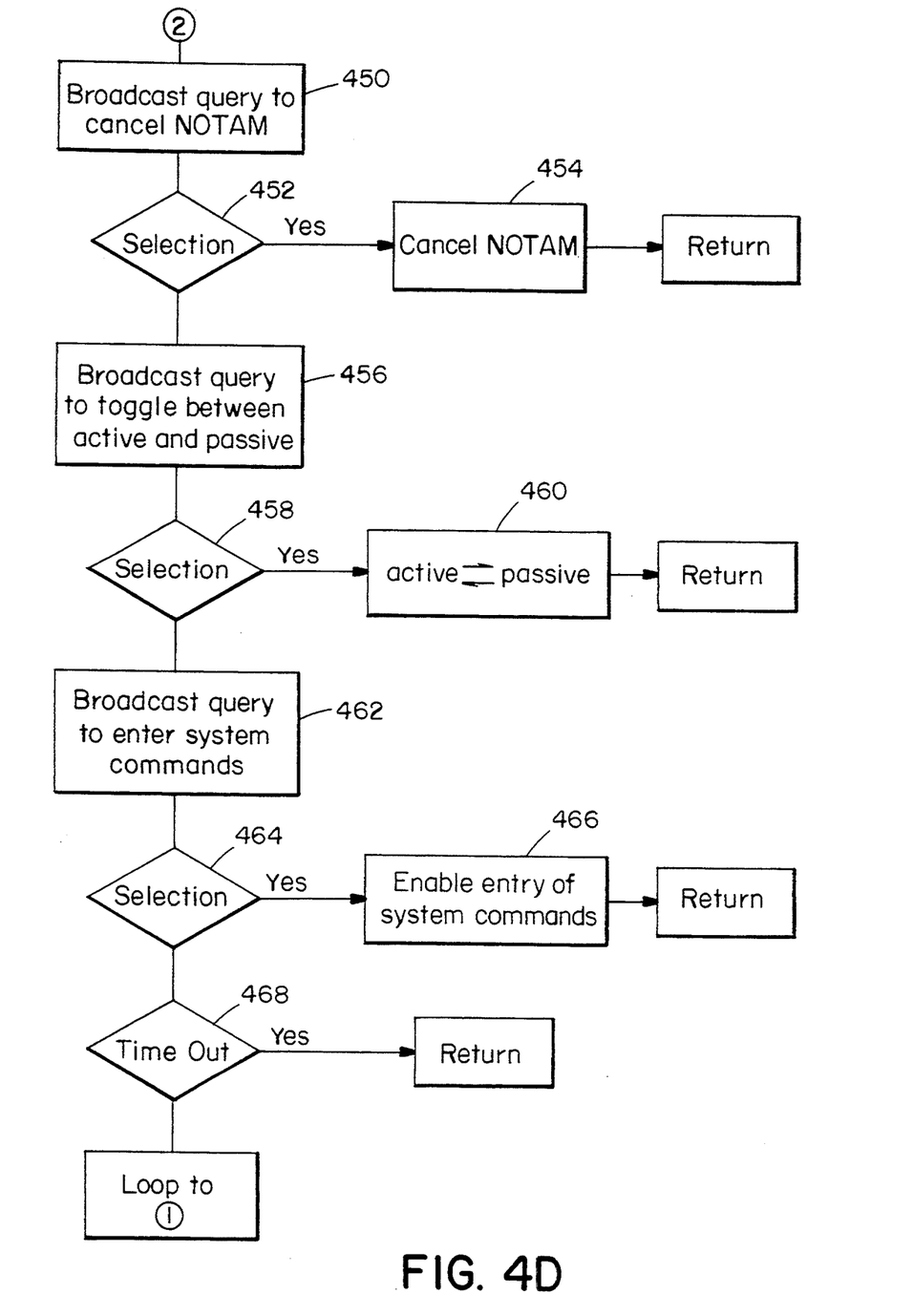

The proprietary mode subroutine enables remote selection of individual functions basically by broadcasting a function option and then waiting for its selection during an approximately two second delay. If during this period, the user clicks twice, the function is considered selected. For example, a first function option would be to add a NOtice To AirMen (NOTAM). After broadcasting the option for this function in step 444, the system then waits two seconds for selection of this function by two clicks of the microphone transmit button. If the function is selected as determined in step 446, then the system confirms selection and allows the user to record the NOTAM in step 448. The next function option, if a NOTAM recording currently exists, is cancellation of the NOTAM announced in step 450 as shown in FIG. 4D. This function is also selectable by clicking twice as determined in step 452 and it will erase any current NOTAM's on the system in step 454. As another function, the system then queries for toggle between a passive and active modes in step 456 which again the user selects by two clicks of the microphone as detected in step 458 to thereby change the system from "sleep" to "awake" or "awake" to "sleep" depending on its current condition in step 460. In the sleep mode, the system continues to monitor the CTAF, but broadcasts no pop-up nor reacts to anything but selection of the propriety mode. Finally, the system queries whether the user wishes to enter system commands in step 462. Selection of the system commands operation in steps 464 and 466 allows the user to reboot the system, save the data in the log, change the altimeter setting, set system clock, set runway heading, and enable/disable preferred runway. The system successively cycles steps 444 through 464 providing the list of selectable functions at least twice until a time-out condition occurs as determined in step 468 and the system automatically branches back to the foreground routine.

Returning to the foreground routine in FIG. 4A after checking for selection and possible performance of the proprietary mode, the system checks for the simultaneous condition of a conversation and the Wait Flag being set to ON. In this situation, the system has been previously put into a wait state by the inactivity on the frequency. The system is reawakened by the conversation and sets the Wait Flag to OFF in step 470 and also sets the pop-up interval to 10 seconds. Therefore, a pilot entering the airport, who makes a blind transmission to other potential air traffic, will hear a pop-up in ten seconds and be informed of the availability of a weather advisory or radio check.

After the detection of an event in step 420 and any subsequent action, the system modifies the advisory abbreviation variable in response to the TENTHCONV and the FIFTHCONV variables provided by the background routine in step 474. Specifically, in response to the sum of the variables TENTHCONV $T_{10}$ and FIFTHCONV $T_5$, the system enters one of the five levels of abbreviation of the weather advisory as described in Table II above.

The modification of the address abbreviation and the time between the pop-up intervals allows the system to adapt to high traffic instances and essentially fall into the background in such situations. Therefore, this system will not take up valuable broadcast time in situations where the channel is required for the more important inter-party communication role.

Those skilled in the art will know, or be able to ascertain using no more than routine experimentation, many equivalents to the specific embodiments of the invention described herein. These and all other equivalents are intended to be encompassed by the following claims.

We claim:

1. A method for automatically providing weather advisories to pilots for an airport, comprising:
   automatically determining weather conditions at the airport;
   periodically transmitting the weather advisories in response to the weather conditions on a radio frequency assigned to the airport even when no broadcasts on the frequency from other sources are detected;
   monitoring the radio frequency for broadcasts from other sources; and
   adaptively changing a period between successive transmissions on the radio frequency of the weather advisories in response to a frequency of the broadcasts from other sources.

2. A method for automatically providing weather advisories to pilots for an airport, comprising:
   automatically determining weather conditions at the airport;
   periodically transmitting the weather advisories in response to the weather conditions on a radio frequency assigned to the airport even when no broadcasts on the radio frequency from other sources are detected;
   monitoring the radio frequency for broadcasts from other sources; and
   adaptively changing a length of the weather advisories in response to a frequency of the broadcasts from the other sources.

3. A method as claimed in claim 1, further comprising:
   monitoring the broadcasts from the other sources on the radio frequency; and
   delaying a periodic transmission of the weather advisories in response to a concurrent broadcast from the other sources.

4. A method for providing airport weather information to pilots using an automatic weather transmission system, the method comprising:

determining weather conditions;

transmitting periodic messages announcing a presence of the system and instructions for use of the system on a radio frequency assigned to the airport;

responding to pilot requests to access the system by transmitting on the radio frequency information concerning the determined weather conditions; and preventing transmission on the radio frequency of the periodic messages to avoid interfering with transmission from other sources on the radio frequency.

5. A method as claimed in claim 4, wherein determining weather conditions comprises sensing wind speed and wind direction.

6. A method as claimed in claim 4, wherein the pilot accesses the system by transmitting according to a predetermined protocol.

7. A method as claimed in claim 6, wherein the predetermined protocol is generated by sequentially depressing a transmit button of a radio transmitter on an aircraft.

8. A method for automatically providing weather advisories for an airport to pilots using an automatic weather monitoring system, the method comprising:

determining weather conditions at the airport;

generating the weather advisories in response to the weather conditions;

monitoring broadcasts from other sources on a common traffic advisory frequency of the airport;

determining existence of a converstation by the other sources on the frequency;

broadcasting on the advisory frequency one of a message containing instructions on accessing the system to obtain the weather advisories or the weather advisory; and delaying the broadcasts for a predetermined time period after the end of a conversation from the other sources.

9. A method as claimed in claim 8, wherein monitoring the broadcasts from the other sources comprises:

detecting carrier signals on the common traffic advisory channel;

classifying detected carrier signals as transients or conversations in response to a length of the carrier signals.

10. A method for providing weather advisories to pilots for an airport using an automatic weather monitoring system, the method comprising:

automatically determining weather conditions;

periodically broadcasting a menu on a radio frequency assigned to the airport, the menu including a weather advisory option being selectable by broadcasting a predetermined protocol on the radio frequency;

detecting broadcast of the predetermined protocol on the radio frequency; and broadcasting the weather advisory on the radio frequency in response to detection of the predetermined protocol.

11. A method as claimed in claim 10, wherein the radio frequency is a common traffic advisory frequency assigned to the airport.

12. A method as claimed in claim 10, further comprising:

monitoring broadcasts from other sources on the radio frequency; and adaptively changing a period between successive broadcasts of the menu in response to a frequency of the broadcasts from other sources.

13. A method as claimed in claim 10, further comprising:

monitoring broadcasts from other sources on the radio frequency; and adaptively changing a length of the weather advisory in response to a frequency of the broadcasts from other sources.

14. A method as claimed in claim 11, further comprising:

monitoring for a broadcast from another source on the radio frequency; and delaying a broadcast of the menu in response to a concurrent broadcast from the other source on the radio frequency.

15. A device for broadcasting weather advisories to pilots, comprising:

an automatic weather station for generating weather data indicative of weather conditions;

a central processing unit for periodically generating synthesized voice menus, and for selectively generating weather advisories from the weather data in response to a carrier detect signal; and a transceiver for generating the carrier detect signal in response to detection of broadcasts on a radio frequency assigned to the device from other sources, and for broadcasting on the radio frequency the periodic synthesized voice menus and weather advisories.

16. A device as claimed in claim 15, wherein the central processing unit generates classifications of the broadcasts from the other sources in response to lengths of the carrier detect signal, and adaptively changes time periods between successive broadcasts of the synthesized voice menus in response to the classifications.

17. A device as claimed in claim 15, wherein the central processing unit generates classifications of the broadcasts by other sources in response to the lengths of the carrier detect signal, and adaptively changes lengths of the weather advisories in response to the classifications.

18. A device as claimed in claim 15, wherein:

the transceiver receives the broadcasts from the other sources, and broadcasts recorded messages; and the central processing unit generates the menu to indicate a radio check option selectable by a predetermined protocol, monitors the carrier detect signal to determine receipt of the predetermined protocol, records the broadcasts from the other sources in response to receipt of the predetermined protocol, and replays the recorded broadcasts as the recorded messages broadcasted by the transceiver.

19. A device as claimed in claim 18, wherein the central processing unit generates a confirmation of the selection of the radio check option for broadcast by the transceiver.

20. A device as claimed in claim 18, wherein the predetermined protocol comprises a predetermined number of clicks generated by depressing a talk button of a remote transmitter.

21. A method as claimed in claim 11, further comprising broadcasting a preferred runway in response to wind direction on the common traffic advisory frequency.

22. A method as claimed in claim 21, further comprising updating the preferred runway in response to a wind change only when a frequency of broadcasts from other sources is at a minimum.

23. A method as claimed in claim 2, further comprising:
   monitoring the broadcasts from the other sources on the channel; and
   delaying a periodic transmission of the weather advisories in response to a concurrent broadcast from the other sources.

24. A method as claimed in claim 1, wherein the channel is a common traffic advisory frequency.

25. A method as claimed in claim 2, wherein the channel is a common traffic advisory frequency.

26. A method as claimed in claim 1, further comprising: adaptively changing a length of the weather advisories in response to the frequency of the broadcasts from the other sources.

27. A device as claimed in claim 15, wherein the menus contain instructions that the weather advisory is broadcast in response to transmission of a predetermined protocol.

28. A device as claimed in claim 27, wherein the central processing unit detects for transmission of the predetermined protocol by monitoring the carrier detect signal.

29. A method as claimed in claim 4, further comprising:
   broadcasting messages having instructions for a selectable radio check option;
   in response to selection of the radio check option by a remote broadcast source, generating a recording of a broadcast of the remote broadcast source; and
   rebroadcasting the broadcast of the remote broadcast source by playing back the recording.

30. A method as claimed in claim 29, wherein the selection of the radio check option comprises the remote broadcast source broadcasting in accordance with a predetermined protocol.

31. A method as claimed in claim 30, wherein the selection of the radio check option further comprises confirming selection of the radio check option to the remote broadcast source.

32. A method as claimed in claim 30, wherein broadcasting the predetermined protocol comprises the remote broadcast source generating a predetermined number of clicks by depressing a talk switch of a transceiver.

33. A method as claimed in claim 4, wherein preventing the transmission to avoid the interference of the periodic messages comprises delaying transmission of one of the messages in response to detecting a carrier signal from another source.

34. A device for automatically transmitting weather information, comprising:
   an automatic weather station for generating weather data indicative of weather conditions;
   a transceiver for generating a carrier detect signal in response to detection of a carrier signal from another source on a radio frequency assigned to the device, for broadcasting on the radio frequency audible messages announcing the presence of the device and instructions for use of the device, and for broadcasting on the radio frequency weather advisories indicative of the weather data; and
   a central processing unit for periodically generating the messages, and for generating the weather advisories in response to the carrier detect signal indicating a pilot request to access the device.

35. A device as claimed in claim 34, wherein the pilot request for access to the device is indicated by a carrier detect signal generated by sequential depression of a transmit button of another source.

36. A method for providing information to pilots for an airport, the method comprising:
   periodically broadcasting a menu on a radio frequency assigned to the airport including information categories, different ones of the information categories being selectable by broadcasting corresponding predetermined protocols on the radio frequency;
   detecting broadcast of the predetermined protocols on the radio frequency;
   broadcasting information on the radio frequency corresponding to a selected one of the information categories indicated by the received one of the predetermined protocols; and
   preventing broadcast on the radio frequency of the menu in response to a concurrent broadcast on the radio frequency from another source.

37. A method as claimed in claim 36 wherein the information categories comprise weather information and airport information.

38. A method as claimed in claim 37, wherein the information categories further comprise a radio check option.

39. A method as claimed in claim 36, wherein the menu includes weather information.

* * * * *